(12) United States Patent
Dai et al.

(10) Patent No.: US 10,629,941 B2
(45) Date of Patent: Apr. 21, 2020

(54) MAKING A POUCH FORMAT CELL AND ATTACHING A TAB TO AN ELECTRODE

(71) Applicant: GM GLOBAL TECHNOLOGY OPERATIONS LLC, Detroit, MI (US)

(72) Inventors: Fang Dai, Troy, MI (US); Qiangfeng Xiao, Troy, MI (US); Li Yang, Troy, MI (US); Mei Cai, Bloomfield Hills, MI (US); Sherman H. Zeng, Troy, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 557 days.

(21) Appl. No.: 15/377,752

(22) Filed: Dec. 13, 2016

(65) Prior Publication Data

US 2017/0214079 A1 Jul. 27, 2017

Related U.S. Application Data

(60) Provisional application No. 62/286,122, filed on Jan. 22, 2016.

(51) Int. Cl.
*H01M 10/04* (2006.01)
*H01M 10/052* (2010.01)
(Continued)

(52) U.S. Cl.
CPC ......... *H01M 10/045* (2013.01); *H01M 4/362* (2013.01); *H01M 4/38* (2013.01);
(Continued)

(58) Field of Classification Search
None
See application file for complete search history.

(56) References Cited

U.S. PATENT DOCUMENTS 8,137,832 B2 3/2012 Machida
8,815,427 B2 8/2014 Machida
(Continued)

FOREIGN PATENT DOCUMENTS

CN 1770507 A 5/2006
CN 201084777 Y 7/2008
(Continued)

OTHER PUBLICATIONS

Second Office Action for Chinese Patent Application No. 201710047716.0 dated Jul. 29, 2019 with correspondence dated Aug. 6, 2019 from China Patent Agent (H.K.) Ltd. summarizing contents, 6 pages.
(Continued)

*Primary Examiner* — Wyatt P McConnell
(74) *Attorney, Agent, or Firm* — Harness, Dickey & Pierce, P.L.C.

(57) ABSTRACT

To make a pouch format cell, an outermost stack (including a negative electrode and separators positioned on opposed surfaces thereof) is formed. An inner stack is formed, including a positive electrode and a sub-stack (i.e., another negative electrode with separators positioned on opposed surfaces thereof and another positive electrode). The inner stack is positioned on the outermost stack to form a core stack, such that i) one inner stack end substantially aligns with one outermost stack end, ii) another end and a portion of the outermost stack remain exposed, and iii) the inner stack positive electrode is adjacent to one of the outermost stack separators. The outermost stack exposed portion is folded around another inner stack end and to cover a portion of an outer layer of the inner stack. This forms an initial overlay. The core stack is folded around at least a portion of the initial overlay.

15 Claims, 3 Drawing Sheets

(51) Int. Cl.
  *H01M 4/38* (2006.01)
  *H01M 10/0583* (2010.01)
  *H01M 4/36* (2006.01)
  *H01M 4/58* (2010.01)
  *H01M 4/587* (2010.01)

(52) U.S. Cl.
  CPC ........... *H01M 4/382* (2013.01); *H01M 4/587* (2013.01); *H01M 4/5815* (2013.01); *H01M 10/052* (2013.01); *H01M 10/0583* (2013.01)

(56) References Cited

U.S. PATENT DOCUMENTS

| | | |
|---|---|---|
| 8,945,744 B2 | 2/2015 | Kwon et al. |
| 10,116,006 B2 | 10/2018 | Machida |
| 2015/0318579 A1 | 11/2015 | Kwon et al. |

FOREIGN PATENT DOCUMENTS

| | | |
|---|---|---|
| CN | 101304103 A | 11/2008 |
| CN | 103765665 A | 4/2014 |
| CN | 106997963 A | 8/2017 |
| DE | 102017200891 A1 | 7/2017 |
| EP | 1655794 A2 | 5/2006 |

OTHER PUBLICATIONS

First Office Action for Chinese Patent Application No. 201710047716.0 dated Feb. 3, 2019 with English language machine translation, 11 pages.

MAKING A POUCH FORMAT CELL AND ATTACHING A TAB TO AN ELECTRODE

CROSS-REFERENCE TO RELATED APPLICATION

This application claims the benefit of U.S. Provisional Application Ser. No. 62/286,122, filed Jan. 22, 2016, which is incorporated by reference herein in its entirety.

INTRODUCTION

Secondary, or rechargeable, lithium-based batteries are often used in many stationary and portable devices, such as those encountered in the consumer electronic, automobile, and aerospace industries. The lithium class of batteries has gained popularity for various reasons, including a relatively high energy density, a general nonappearance of any memory effect when compared with other kinds of rechargeable batteries, a relatively low internal resistance, a low self-discharge rate when not in use, and an ability to be formed into a wide variety of shapes (e.g., prismatic) and sizes so as to efficiently fill available space in electric vehicles, cellular phones, and other electronic devices. In addition, the ability of lithium-based batteries to undergo repeated power cycling over their useful lifetimes makes them an attractive and dependable power source.

SUMMARY

Examples of methods for making a pouch format cell and examples of tab attachment methods are disclosed herein.

In an example of the method for making the pouch format cell, an outermost stack is formed, including a negative electrode and separators positioned on opposed surfaces of the negative electrode. An inner stack is also formed, including a positive electrode and at least one sub-stack of another negative electrode, another positive electrode, and other separators positioned on opposed surfaces of the other negative electrode. The inner stack is positioned on the outermost stack such that i) one end of the inner stack substantially aligns with one end of the outermost stack, ii) another end and a portion of the outermost stack remain exposed, and iii) the positive electrode of the inner stack is adjacent to one of the separators of the outermost stack. This forms a core stack. The exposed portion of the outermost stack is folded around another end of the inner stack and to cover a portion of an outer layer of the inner stack in order to form an initial overlay. The core stack is folded a predetermined number of times around at least a portion of the initial overlay.

In an example of the tab attachment method, a sandwich structure is formed, including a first piece of foil positioned adjacent to an electrode, which is positioned adjacent to an electrode tab, which is positioned adjacent to a second piece of foil. The sandwich structure is welded.

BRIEF DESCRIPTION OF THE DRAWINGS

Features of examples of the present disclosure will become apparent by reference to the following detailed description and drawings, in which like reference numerals correspond to similar, though perhaps not identical, components. For the sake of brevity, reference numerals or features having a previously described function may or may not be described in connection with other drawings in which they appear.

DETAILED DESCRIPTION

Lithium-based batteries generally operate by reversibly passing lithium ions between a negative electrode (sometimes called an anode) and a positive electrode (sometimes called a cathode). The negative and positive electrodes are situated on opposite sides of a porous polymer separator soaked with an electrolyte solution that is suitable for conducting the lithium ions. During charging, lithium ions are inserted/intercalated into the negative electrode, and during discharging, lithium ions are extracted from the negative electrode. Each of the electrodes is also associated with respective current collectors, which are connected by an interruptible external circuit that allows an electric current to pass between the negative and positive electrodes. Examples of lithium-based batteries include the lithium sulfur battery (e.g., a lithium negative electrode paired with a sulfur-based positive electrode), the silicon sulfur battery (e.g., a silicon based negative electrode paired with a sulfur-based positive electrode), the lithium ion battery (e.g., a non-lithium based negative electrode paired with a lithium-based positive electrode), and the lithium lithium battery (lithium-based positive and lithium-based negative electrodes paired together).

Lithium-based batteries can take on a variety of configurations, including a pouch cell. Some examples of the method disclosed herein create an initial overlay and then utilize a folding or winding process to generate a pouch format cell. The pouch format cell has n layers of positive and negative electrodes, and 2n layers of separators. This is in contrast to one example of a traditional pouch cell, which includes n layers of positive electrodes, n+1 layers of negative electrodes, and 2n+2 layers of separators. This is also in contrast to another example of a traditional pouch cell, which includes n layers of positive electrodes, n+1 layers of negative electrodes, and a continuous separator that is wound between the electrodes, because the continuous separator often has a length longer than 2n+2 layers of separators. As such, the method(s) disclosed herein utilize less material, which can increase volumetric energy density.

With certain electrode materials (e.g., lithium negative electrodes, sulfur-based positive electrodes), the electrode in the pouch format cell disclosed herein may be formed without a current collector. This can increase gravimetric and volumetric energy density of the pouch format cell. For lithium negative electrodes, this also eliminates the need to coat both sides of the current collector.

Pouch cells also include tabs that enable the electrodes inside of the pouch to be addressed. The tab attachment method disclosed herein provides a relatively efficient way to attach tabs to the individual electrodes. This method eliminates the need for a special die to create a tab-attachment space on the electrode. This method may also improve the mechanical properties of the attachment. This method may also increase the contact between the tab and the electrode, e.g., when compared with the contact obtained through a press process.

Figures 1A, 1B:
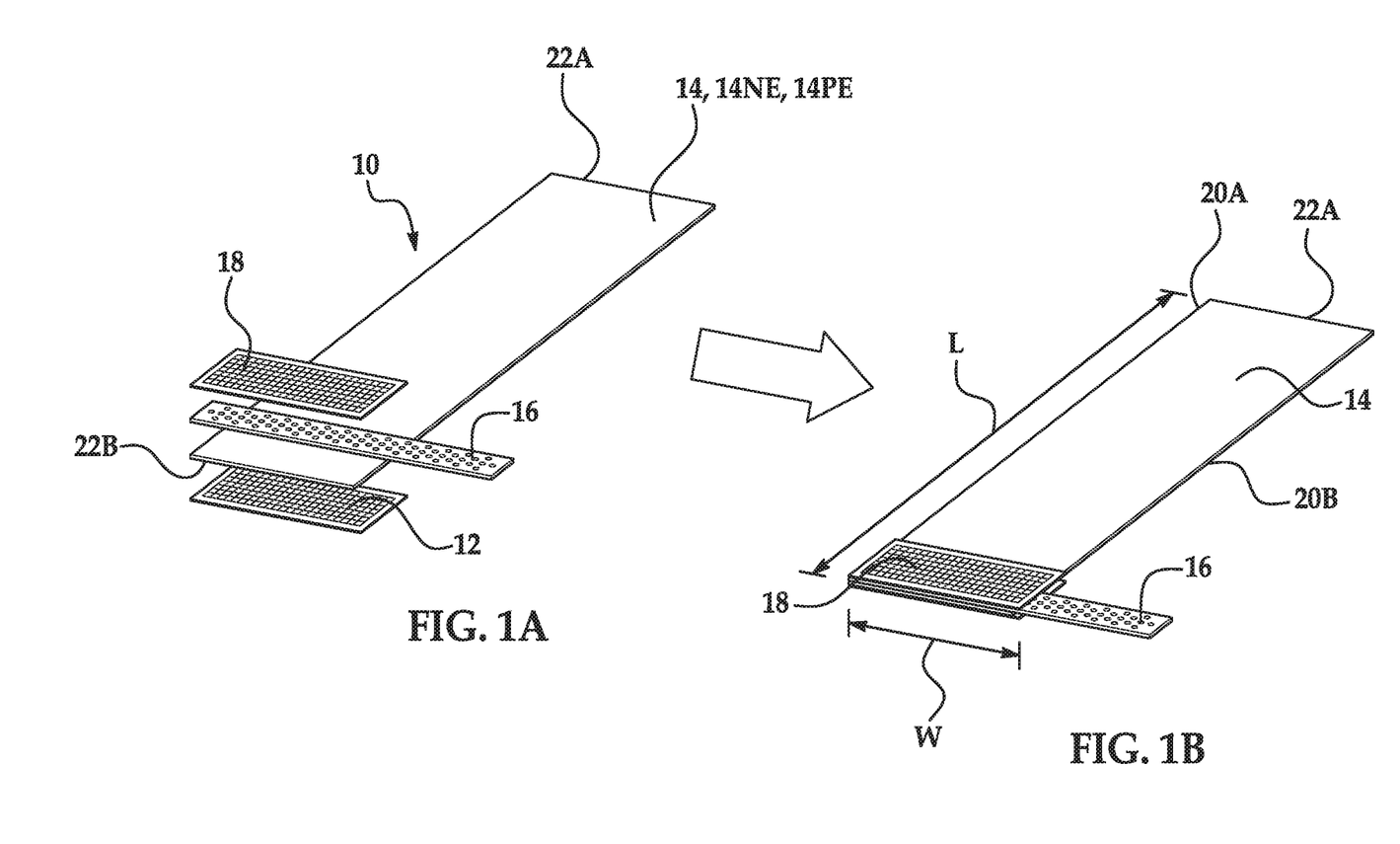
FIGS. 1A and 1B are schematic and perspective views of an example of the tab attachment method disclosed herein.

An example of the tab attachment process is shown in FIGS. 1A and 1B. In FIG. 1A, a sandwich structure 10 is formed, and in FIG. 1B, the sandwich structure 10 is welded.

The sandwich structure 10 includes a first piece of foil 12, an electrode 14, an electrode tab 16, and a second piece of foil 18. As depicted, the first piece of foil 12 is positioned adjacent to the electrode 14, which is positioned adjacent to the electrode tab 16, which is positioned adjacent to second piece of foil 18. In this particular example, the components 12, 14, 16, 18 of the sandwich structure 10 are positioned in a manner so that when they are welded (FIG. 1B), each component 12, 14, 16, 18 contacts the adjacent component (e.g., 12 contacts 14, which contacts 16, which contacts 18), and the electrode 12 and the electrode tab 16 and sandwiched between the first and second pieces of foil 18.

The first piece of foil 12, the electrode tab 16, and the second piece of foil 18 may be positioned anywhere along the length L and width W (shown in FIG. 1B) of the electrode 14 where it is desirable for the electrode tab 16 to be attached to the electrode 14. While FIG. 1B illustrates the electrode tab 16 extending from one side 20B of the electrode 14 after welding is performed, it is to be understood that the electrode tab 16 may alternatively extend from the other side 20A or from either of the ends 22A, 22B of the electrode 14. Where the electrode tab 16 extends outward from the electrode 14 depends, at least in part upon the configuration of the final cell.

The electrode 14 may be a negative electrode 14NE or a positive electrode 14 PE. Depending upon the material of the electrode 14, the electrode 14 may or may not include a current collector upon which the active material (and in some instances binder and conductive filler) are disposed.

Examples of the negative electrode 14NE include lithium metal (e.g., lithium foil) and carbon. The lithium metal and some examples of carbon negative electrodes 14NE are current collector-free. Other examples of the negative electrode 14NE include graphite, lithium titanate, silicon, $SiO_x$ (0<x≤2), silicon alloys (e.g., Si—Sn), silicon-carbon composites, tin, or tin oxide. These materials are active materials that may be combined with binder and/or conductive filler and disposed on a nickel or copper current collector to form the negative electrode 14NE. Still another example of the negative electrode 14 NE is a copper current collector that is loaded with lithium.

An example of the positive electrode 14PE includes a sulfur-carbon composite (e.g., weight ratio of sulfur to carbon ranges from 1:9 to 9:1). The sulfur-carbon composite positive electrodes 14PE are current collector-free. In some instances, the sulfur-carbon composite may be combined with a binder and/or conductive filler to form the positive electrode 14PE. Other examples of the positive electrode 14PE active materials that may be combined with binder and/or conductive filler and disposed on an aluminum current collector to form the positive electrode 14PE. Examples of the positive electrode active materials include spinel lithium manganese oxide ($LiMn_2O_4$), lithium cobalt oxide (LCO, $LiCoO_2$), a manganese-nickel oxide spinel [Li($Mn_{1.5}Ni_{0.5}$)$O_2$], a layered nickel-manganese-cobalt oxide (having a general formula of $xLi_2MnO_3 \cdot (1-x)LiMO_2$, where M is composed of any ratio of Ni, Mn and/or Co). A specific example of the layered nickel-manganese-cobalt oxide includes ($xLi_2MnO_3 \cdot (1-x)Li(Ni_{1/3}Mn_{1/3}Co_{1/3})O_2$).

Other suitable positive electrode active materials include $Li(Ni_{1/3}Mn_{1/3}Co_{1/3})O_2$, $Li_{x+y}Mn_{2-y}O_4$ (LMO, 0<x<1 and 0<y<0.1), a lithium iron polyanion oxide (such as lithium iron phosphate ($LiFePO_4$) or lithium iron fluorophosphate ($Li_2FePO_4F$)), $LiNi_{1-x}Co_{1-y}M_{x+y}O_2$ or $LiMn_{1.5-x}Ni_{0.5-y}M_{x+y}O_4$ (where M is composed of any ratio of Al, Ti, Cr, and/or Mg), stabilized lithium manganese oxide spinel ($Li_xMn_{2-y}M_yO_4$, where M is composed of any ratio of Al, Ti, Cr, and/or Mg), lithium nickel cobalt aluminum oxide (e.g., $LiNi_{0.8}Co_{0.15}Al_{0.05}O_2$ or NCA), aluminum stabilized lithium manganese oxide spinel (e.g., $Li_xAl_{0.05}Mn_{0.95}O_2$), lithium vanadium oxide ($LiV_2O_5$), $Li_2MSiO_4$ (where M is composed of any ratio of Co, Fe, and/or Mn), and any other high energy nickel-manganese-cobalt material (HE-NMC, NMC or $LiNiMnCoO_2$). By "any ratio" it is meant that any element may be present in any amount. So, in some examples, M could be Al, with or without Cr, Ti, and/or Mg, or any other combination of the listed elements. In another example, anion substitutions may be made in the lattice of any example of the lithium transition metal based active material to stabilize the crystal structure. For example, any O atom may be substituted with an F atom.

The binder material may be used to structurally hold the active material together. Examples of the binder material include polyvinylidene fluoride (PVdF), polyethylene oxide (PEO), an ethylene propylene diene monomer (EPDM) rubber, carboxymethyl cellulose (CMC), styrene-butadiene rubber (SBR), styrene-butadiene rubber carboxymethyl cellulose (SBR-CMC), polyacrylic acid (PAA), cross-linked polyacrylic acid-polyethylenimine, polyimide, or any other suitable binder material. Other suitable binders include polyvinyl alcohol (PVA), sodium alginate, or other water-soluble binders.

The conductive filler material may be a conductive carbon material. The conductive carbon material may be a high surface area carbon, such as acetylene black (e.g., SUPER P® conductive carbon black from TIMCAL). The conductive filler material is included to ensure electron conduction between the sulfur-based active material and the current collector and/or the electrode tab 16.

The first piece of foil 12 and the second piece of foil 18 may be formed of the same material. For the negative electrode 14NE, the foil pieces 12, 18 may be formed of nickel foil or copper foil. For the positive electrode 14PE, the foil pieces 12, 18 may be aluminum foil. These foil pieces 12, 18 may improve the mechanical property of the tab attachment.

The material of the electrode tab 16 may also depend upon whether the electrode 14 is a positive electrode 14PE or a negative electrode 14NE. An example of a suitable material for the electrode tab 16 of the positive electrode 14PE is aluminum, and examples of suitable materials for the electrode tab 16 of the negative electrode 14NE include copper or nickel.

As mentioned above, once the sandwich structure 10 is formed, the components 12, 14, 16, 18 are welded together. Any suitable welding process may be used, examples of which include ultra-sonic welding, spot-welding, etc.

The tab attachment method shown and described in FIGS. 1A and 1B may be used to secure the electrode tab 16 to the electrode 14. The electrode 14 may then be used in example(s) of the lithium-based battery, including lithium ion batteries, lithium or silicon sulfur batteries, lithium lithium batteries, etc. The type of lithium-based battery in which the electrode 14 is used depends upon the active material in the electrode 14.

Figure 2A:
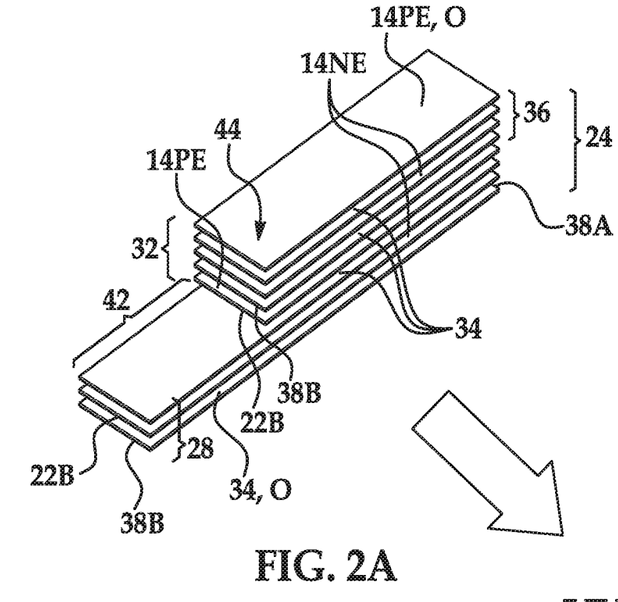
FIGS. 2A and 2B are schematic perspective views of part of an example of the method for making a pouch format cell, which results in the formation of an initial overlap.
Figure 2B:
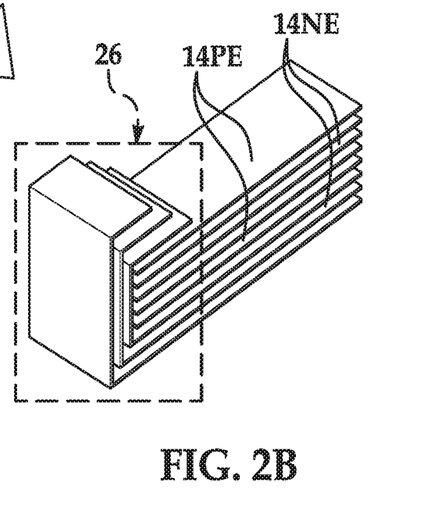
Figure 4:
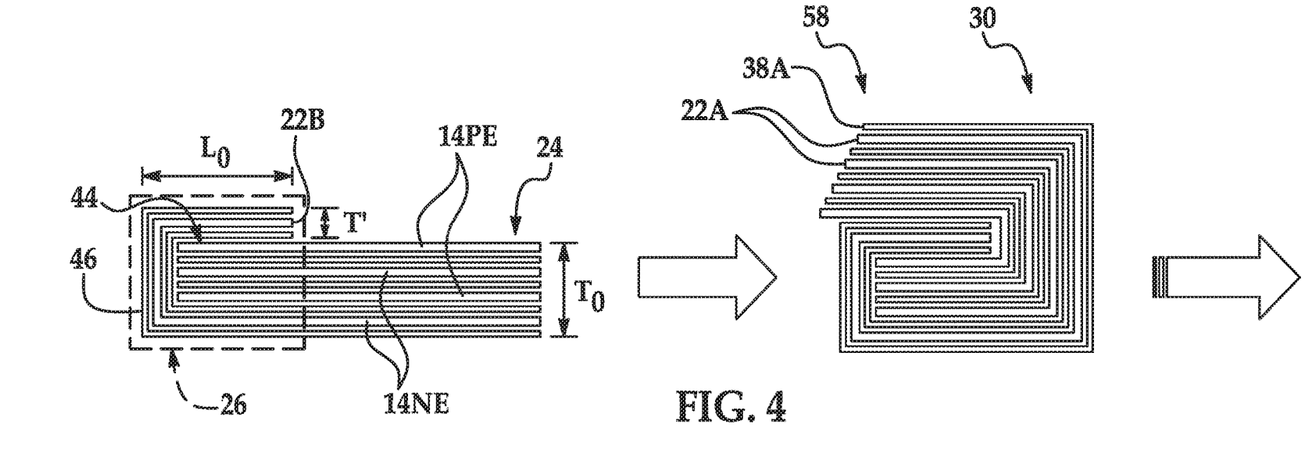
FIG. 4 illustrates another part of the example of the method for making the pouch format cell, where the initial overlay and pouch format cell shown as schematic cross-sections.

The electrode 14 may also be used in example(s) of the method for making a pouch format cell. An example of the method is shown in FIGS. 2A-2B and 4. FIGS. 2A and 2B illustrate the formation of a core stack 24 and the initial overlay 26, and FIG. 4 illustrates the winding/folding process that results in the formation of the pouch format cell 30.

The method for making a pouch format cell 30 (FIG. 4) includes forming an outermost stack 28 and an inner stack 32.

The outermost stack 28 includes a negative electrode 14NE (e.g., the bottom most negative electrode 14NE in FIG. 2A) and separators 34 positioned on opposed surfaces of the negative electrode 14NE.

The inner stack 32 includes a positive electrode 14PE and at least one sub-stack 36. The sub-stack 36 includes another negative electrode 14NE, another positive electrode 14PE, and other separators 34 positioned on opposed surfaces of the other negative electrode 14NE. While not shown, it is to be understood that the inner stack 32 may include any number of sub-stacks 36 positioned on the positive electrode 14PE.

Each of the separators 34 may be formed, e.g., from a polyolefin. The polyolefin may be a homopolymer (derived from a single monomer constituent) or a heteropolymer (derived from more than one monomer constituent), and may be either linear or branched. If a heteropolymer derived from two monomer constituents is employed, the polyolefin may assume any copolymer chain arrangement including those of a block copolymer or a random copolymer. The same holds true if the polyolefin is a heteropolymer derived from more than two monomer constituents. As examples, the polyolefin may be polyethylene (PE), polypropylene (PP), a blend of PE and PP, or multi-layered structured porous films of PE and/or PP. Commercially available porous separators 34 include single layer polypropylene membranes, such as CELGARD 2400 and CELGARD 2500 from Celgard, LLC (Charlotte, N.C.). It is to be understood that the separators 34 may be coated or treated, or uncoated or untreated. For example, the porous separators 34 may or may not be coated or include any surfactant treatment thereon.

In other examples, the porous separators 34 may be formed from another polymer chosen from polyethylene terephthalate (PET), polyvinylidene fluoride (PVdF), polyamides (Nylons), polyurethanes, polycarbonates, polyesters, polyetheretherketones (PEEK), polyethersulfones (PES), polyimides (PI), polyamide-imides, polyethers, polyoxymethylene (e.g., acetal), polybutylene terephthalate, polyethylenenaphthenate, polybutene, polyolefin copolymers, acrylonitrile-butadiene styrene copolymers (ABS), polystyrene copolymers, polymethylmethacrylate (PMMA), polyvinyl chloride (PVC), polysiloxane polymers (such as polydimethylsiloxane (PDMS)), polybenzimidazole (PBI), polybenzoxazole (PBO), polyphenylenes (e.g., PARMAX™ (Mississippi Polymer Technologies, Inc., Bay Saint Louis, Miss.)), polyarylene ether ketones, polyperfluorocyclobutanes, polytetrafluoroethylene (PTFE), polyvinylidene fluoride copolymers and terpolymers, polyvinylidene chloride, polyvinylfluoride, liquid crystalline polymers (e.g., VECTRAN™ (Hoechst AG, Germany) and ZENITE® (DuPont, Wilmington, Del.)), polyaramides, polyphenylene oxide, and/or combinations thereof. It is believed that another example of a liquid crystalline polymer that may be used for the porous separators 34 is poly(p-hydroxybenzoic acid). In yet another example, the porous separators 34 may be chosen from a combination of the polyolefin (such as PE and/or PP) and one or more of the other polymers listed above.

The porous separators 34 may be a single layer or may be a multi-layer (e.g., bilayer, trilayer, etc.) laminate fabricated from either a dry or wet process.

The porous separators 34 operate as an electrical insulator (preventing the occurrence of a short), a mechanical support, and a barrier to prevent physical contact between adjacent electrodes 14NE, 14PE. The porous separators 34 also ensure passage of lithium ions through an electrolyte solution filling its pores.

The method further includes positioning the inner stack 32 on the outermost stack 28 to form the core stack 24, which is composed of all of the components of the inner stack 32 and the outermost stack 28. The positioning of the inner stack 32 on the outermost stack 28 is performed such that i) one end of the inner stack 32 substantially aligns with one end of the outermost stack 28, ii) another end of the outermost stack 28 and a portion 42 of the outermost stack 28 remain exposed, and iii) the positive electrode 14PE (which is not part of the sub-stack 36) of the inner stack 32 is adjacent to one of the separators 34 (which is not the outermost separator 34, O) of the outermost stack 28. Each of these conditions for positioning the inner stack 32 on the outermost stack 28 will be described further.

Figure 3:
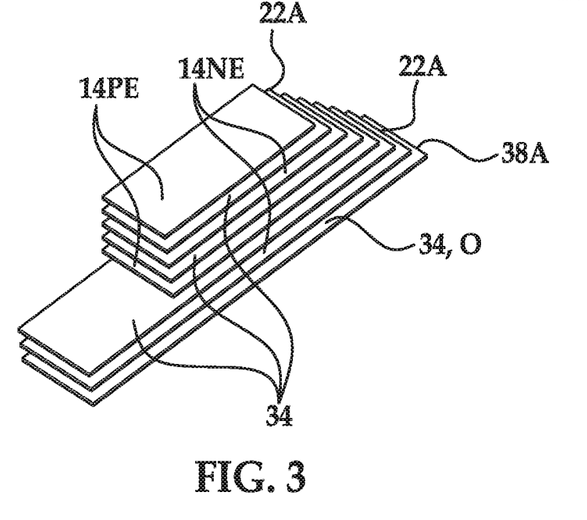
FIG. 3 is a schematic perspective view of an inner stack positioned on an outermost stack, where one end of the inner stack substantially aligns with the outermost stack.

The inner stack 32 is positioned on the outermost stack 28 such that one end of the inner stack 32 substantially aligns with one end of the outermost stack 28. By "substantially aligns" and "substantially aligned," it is meant that one end 22A or 22B (shown in FIGS. 1A and 1B) of each electrode 14NE, 14PE and the corresponding one end 38A or 38B of each separator 34 line up with one another, or are within a suitable distance from the end 22A or 22B or 38A or 38B of the electrode 14NE, 14PE or the separator 34 have the shortest length L of all of the core stack 24 components. The ends 22A or 22B and the ends 38A or 38B may be substantially aligned prior to the winding/folding process (e.g., as shown FIGS. 2A and 3) and/or may be substantially aligned after the winding folding process (e.g., as shown in FIG. 4). One example of the substantially aligned ends 22A or 22B and 38A or 38B is shown in FIG. 2A, where all of the ends 22A and 38A line up with one another (e.g., an imaginary vertical plane is formed at the ends 22A and 38A). Another example of the substantially aligned ends 22A or 22B and 38A or 38B is shown in FIG. 3, where all of the ends 22A and 38A extend a suitable distance from the end 22A of the top most electrode 14PE having the shortest length of all the core stack 24 components. In FIG. 3, the positive electrode 14PE having the shortest length is the top or outermost electrode 14PE in the inner stack 32, and the ends 22A and 38A of each of the electrodes 14NE, 14PE and the other separators 34 extend a suitable distance from the end 22A of the top most electrode 14PE. As an example, the suitable distance for substantial alignment may be at least 1 mm. For example, moving down the core stack 24 from the top most electrode 14PE, the end 38A of each separator 34 and the end 22A of electrode 14NE, 14PE extends 1 mm longer than the electrode 14NE, 14PE or separator 34 directly above it.

Referring back to FIG. 2A, the inner stack 32 is also positioned on the outermost stack 28 such that another end of the outermost stack 28 remains exposed (i.e., is not covered by the inner stack 32). It is to be understood that the other end of the outermost stack 28 shown in FIG. 2A includes ends 38B of the two separators 34 in the stack 28 as well as the end 22B of the negative electrode 14NE in the stack 28.

Additionally, as depicted in FIG. 2A, the inner stack 32 is also positioned on the outermost stack 28 such that the portion 42 of the outermost stack 28 remains exposed (i.e., is not covered by the inner stack 32). The exposed portion 42 is long enough so that it can be folded partially around another end of the inner stack 32. It is to be understood that the other end of the inner stack 32 shown in FIG. 2A includes ends 38B of the two separators 34 in the stack 32 as well as the ends 22B of the positive electrodes 14PE and the negative electrode 14NE in the stack 32. An example of the partial folding of the exposed portion 42 is shown in FIG. 2B. The exposed portion 42 is long enough so that, when folded, the portion 42 can cover the ends 22B, 38B of the electrodes 14PE, 14NE and separators 34 of the inner stack 32 and can also cover a portion 44 of the outer layer of the inner stack 32. In the example shown in FIG. 2A, the outer layer of the inner stack 32 is the positive electrode 14PE, O.

For the portion 42 to remain exposed after the inner stack is positioned on the outermost stack 28, the negative electrode 14NE and separators 34 of the outermost stack 28 are longer than the negative electrode 14NE, the positive electrode 14PE, and other separators 34 of the inner stack 28. In an example, the components of the outermost stack 28 may be about 4 cm longer than components of the inner stack 32. The length of the components (an in particular the electrodes 14PE, 14NE) in the respective stacks 28, 32 may depend, at least in part, upon the active material loading and the desired capacity of the final pouch format cell 30 (FIG. 4). Examples of equations that may be used to estimate the lengths of the positive electrode 14PE (equation I) and the negative electrode 14NE (equation II) include:

$$C_{cathode} = C_{areal} * Width_{cathode} * Length_{cathode} * \text{layer numbers} \quad (I)$$

$$C_{anode} = C_{areal} * Width_{anode} * \text{Inner Length}_{anode} * \text{layer numbers} + C_{areal} * Width_{anode} * \text{initial folding length} * \text{outer layers number} \quad (II).$$

In equation I, $C_{cathode}$ is the capacity of the positive electrode, $C_{areal}$ is the areal capacity, and the layer numbers is the total number of layers in the core stack 24. In equation II, $C_{anode}$ is the capacity of the negative electrode, $C_{areal}$ is the areal capacity, Inner Length$_{anode}$ is the length of the negative electrode 14NE in the inner stack 32, the layer numbers is the total number of layers in the core stack 24, the initial folding length is equal to the length of 42 in FIG. 2A, and the outer layers number is the total number of layers in the outermost stack 28.

As noted above, the inner stack 32 is also positioned on the outermost stack 28 such that the positive electrode 14PE of the inner stack 32 is adjacent to one of the separators 34 of the outermost stack 28. This positive electrode 14PE is the bottommost component of the inner stack 32 and is not considered to be part of the sub-stack 36. This separator 34 is the topmost component of the outermost stack 28 (e.g., opposed to the separator 34, O).

The core stack 24 that is formed includes n number of positive and negative electrodes 14PE, 14NE and 2n number of separators 34, where a single separator is positioned between adjacent positive electrodes 14PE and negative electrodes 14NE.

At FIG. 2A, the core stack 24 is formed. At FIG. 2B, the initial overlay 26 is formed. The initial overlay is formed by folding the exposed portion 42 around the other end of the inner stack 32 such that it covers the ends 22B, 38B of the electrodes 14PE, 14NE and separators 34 of the inner stack 32 and also covers the portion 44 of the outer layer (e.g., 14PE, O) of the inner stack 32.

Referring now to FIG. 4, the winding/folding process that results in the formation of the pouch format cell 30 is depicted. At the left side of FIG. 4, a schematic, cross-section of the core stack 24 and the initial overlay 26 of FIG. 2B is depicted. At the right side of FIG. 4, a schematic, cross-section of the pouch format cell 30 is depicted.

To form the pouch format cell 30 from the core stack 24 and initial overlay 26, the core stack 24 is folded a predetermined number of times (m) around at least a portion of the initial overlay 26. In FIG. 4, the core stack 24 is folded over the initial overlay 26 one time (identified by left-most large hollow arrow in FIG. 4) to form the pouch format cell 30. Depending on the length of the electrodes 14NE, 14PE and separators 24, the core stack 24 may continue to be folded around the bottom portion of the initial overlay 26. Folding may continue around the initial overlay 26 for m number of times (identified by right-most large arrow in FIG. 4).

Several dimensions of the core stack 24 and of the initial overlay 26 are labeled in FIG. 4. The length $L_0$ is the length of the initial overlay 26. This length $L_0$ may be measured from the end 22B of the electrode 14NE or the end 38B of the separator 34 (which covers more of portion 44) to the end 46 of the core stack 24 formed by the folded exposed portion 42. $T_0$ is the total thickness of the core stack 24 and T' is the thickness of the outermost stack 28.

Figure 5:
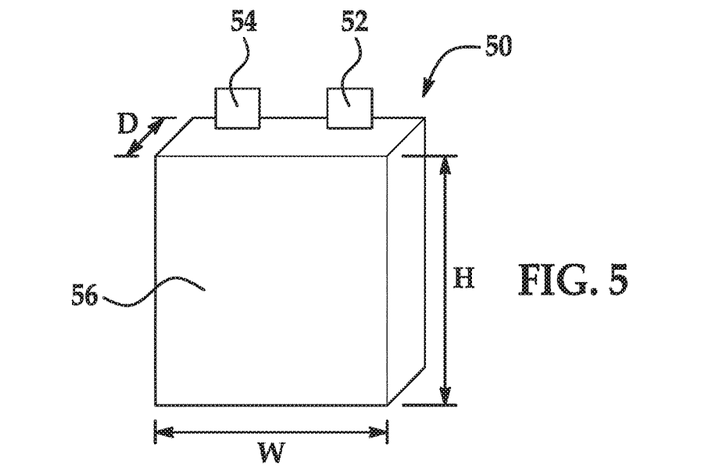
FIG. 5 is a schematic and perspective view of an example of a pouch cell.

At least some of the dimensions for the pouch format cell 30 may be determined using the dimensions of the core stack 24 and the initial overlay 26. Referring briefly to FIG. 5, a pouch cell 50 configured to contain the pouch format cell 30 shown in FIG. 4 has the dimensions of width W, depth D, and height H. The width W may be determined according to Equation III:

$$W = L_0 + m \times T_0 \quad (III)$$

and the depth D may be determined according to Equation IV:

$$D = (m+1) \times T_0 + T' \quad (IV).$$

As shown in FIG. 4, when the winding/folding is complete, the electrode ends 22A and the separator ends 38A at the edge 58 of the wound core stack 24 may be substantially aligned. For example, when the ends 22A, 38A are aligned as shown in FIG. 2A at the outset of the method, they may be substantially aligned as shown in FIG. 4 at the completion of the method. When the ends 22A, 38A are substantially aligned as shown in FIG. 4 at the completion of the method, they may be trimmed so that they line up as shown in FIG. 2A. For another example, when the ends 22A, 38A are aligned as shown in FIG. 3 at the outset of the method, they may be substantially aligned so that the ends 22A and 38A line up with one another (e.g., an imaginary vertical plane is formed at the ends 22A and 38A) at the end of the method. In this example, the ends 22A, 38A may be pre-trimmed so that trimming at the end of the method is not performed.

Additionally, at the conclusion of the winding/folding process, any tabs attached to the negative electrodes 14NE may be welded together to form a single negative electrode tab 52 (FIG. 5), and any tabs attached to the positive electrodes 14PE may be welded together to form a single positive electrode tab 54 (FIG. 5).

When the pouch format cell 30 is complete it may be sealed into a pouch 56, as shown in FIG. 5. An electrolyte may be added to the pouch 56 prior to sealing. The electrolyte used will depend, at least in part, on the electrodes 14NE, 14PE used.

The electrolyte of the lithium ion battery/pouch cell or the lithium-lithium battery/pouch cell includes an organic solvent and a lithium salt dissolved in the organic solvent. Examples of the organic solvent include cyclic carbonates (ethylene carbonate (EC), propylene carbonate, butylene carbonate, fluoroethylene carbonate), linear carbonates (dimethyl carbonate (DMC), diethyl carbonate (DEC), ethylmethyl carbonate (EMC)), aliphatic carboxylic esters (methyl formate, methyl acetate, methyl propionate), γ-lactones (γ-butyrolactone, γ-valerolactone), chain structure ethers (1,2-dimethoxyethane, 1,2-diethoxyethane, ethoxymethoxyethane), cyclic ethers (tetrahydrofuran, 2-methyltetrahydrofuran), and mixtures thereof. In an example, the electrolyte is a mixture of ethylene carbonate, dimethyl carbonate, and diethyl carbonate. Examples of the lithium salt include $LiClO_4$, $LiAlCl_4$, LiI, LiBr, LiSCN, $LiBF_4$, $LiB(C_6H_5)_4$, $LiAsF_6$, $LiCF_3SO_3$, $LiN(FSO_2)_2$ (LIFSI), $LiN(CF_3SO_2)_2$ (LITFSI), $LiPF_6$, $LiB(C_2O_4)_2$ (LiBOB), $LiBF_2(C_2O_4)$ (LiODFB), $LiPF_3(C_2F_5)_3$ (LiFAP), $LiPF_4(CF_3)_2$, $LiPF_4(C_2O_4)$ (LiFOP), $LiNO_3$, $LiPF_3(CF_3)_3$, $LiSO_3CF_3$, and mixtures thereof. In an example, the concentration of the salt in the electrolyte is about 1 mol/L. $LiNO_3$ may also be added to the electrolyte as an additive. In these instances, the concentration of the lithium salt may be about 0.6 mol/L plus the $LiNO_3$ additive.

The electrolyte of the lithium or silicon sulfur battery/pouch cell or the lithium-lithium battery/pouch cell includes an ether based solvent and a lithium salt dissolved in the ether based solvent. Examples of the ether based solvent include 1,3-dioxolane (DOL), 1,2-dimethoxyethane (DME), tetrahydrofuran (THF), 2-methyltetrahydrofuran, 1,2-diethoxyethane, ethoxymethoxyethane, tetraethylene glycol dimethyl ether (TEGDME), polyethylene glycol dimethyl ether (PEGDME), and mixtures thereof. One example of a mixture includes 1,3-dioxolane and 1,2-dimethoxyethane. Any of the previously mentioned salts may be used in this electrolyte. In an example, the concentration of the salt in the electrolyte is about 1 mol/L. This electrolyte may also include other additives, such as $LiNO_3$ (in addition to another lithium salt) and/or a fluorinated ether. When included, the fluorinated ether may be Bis(2,2,2-trifluoroethyl) ether ($F_3C$—$CH_2$—O—$CH_2$—$CF_3$) and/or Propyl 1,1,2,2-tetrafluoroethyl ether ($H_7C_3$—O—$CF_2$—$CHF_2$). The concentration of the fluorinated ether in the electrolyte solution 24 ranges from about 0.1 M to about 1 M.

To further illustrate the present disclosure, an example is given herein. It is to be understood that this example is provided for illustrative purposes and is not to be construed as limiting the scope of the present disclosure.

EXAMPLE

A 1 Ah pouch format cell was fabricated with a nickel-manganese-cobalt (NMC) positive electrode (coated on both sides of an aluminum current collector) and a current collector free lithium metal negative electrode. Tabs were attached to each of the electrodes using the method disclosed herein. An aluminum tab was positioned adjacent to the positive electrode, and both the tab and electrode were sandwiched between two pieces of aluminum foil. The sandwich was ultra-sonically welded to secure the aluminum tab to the positive electrode. A nickel tab was positioned adjacent to the negative electrode, and both the tab and electrode were sandwiched between two pieces of nickel foil. The sandwich was ultra-sonically welded to secure the nickel tab to the negative electrode. The two electrodes were stacked with a separator therebetween. The separator was a polypropylene membrane (CELGARD 2400). In this example, the outermost stack was composed of the negative electrode and the separator, and the inner stack was composed of the positive electrode. This example did not include the additional sub-stack disclosed herein. A portion of the outermost stack was folded around an end of the positive electrode to form the initial overlay, and then the core stack (including of the negative electrode, the separator, and the positive electrode) was folded around the initial overlay 9 times to form the pouch format cell. Various parameters are shown in the following table.

| Folding times | Total Thickness ($T_0$) (cm) | Total Width (W) (cm) | Li length (cm) | Li Weight (g) | NMC Length (cm) | NMC weight (g) |
|---|---|---|---|---|---|---|
| 9 | 0.6360 | 3.225 | 69.96 | 2.24 | 66.18 | 22.87 |

| Separator weight (g) | Tab weight (g) | Electrolyte (g) | Pouch Total Weight (g) | Total weight (g) | Energy Density (Wh/kg) | Capacity (Ah) |
|---|---|---|---|---|---|---|
| 1.46 | 0.2 | 3.33 | 2 | 32.12 | 346.13 | 1.11 |

With a traditional pouch cell design including Cu foils with tab areas and stacked electrodes and separators, the energy density is about 304 Wh/kg. The Cu current collector will be about 4.37 g for the traditional design.

The elimination of the negative-side current collector when using lithium metal as the negative electrode improves the energy density of the pouch format cell disclosed herein.

It is to be understood that the ranges provided herein include the stated range and any value or sub-range within the stated range. For example, a range of from about 0.1 M to about 1 M should be interpreted to include not only the explicitly recited limits of from about 0.1 M to about 1 M, but also to include individual values, such as 0.5 M, 0.75M, etc., and sub-ranges, such as from about 0.3 M to about 0.9 M. Furthermore, when "about" is utilized to describe a value, this is meant to encompass minor variations (up to +/−10%) from the stated value.

Reference throughout the specification to "one example", "another example", "an example", and so forth, means that a particular element (e.g., feature, structure, and/or characteristic) described in connection with the example is included in at least one example described herein, and may or may not be present in other examples. In addition, it is to be understood that the described elements for any example may be combined in any suitable manner in the various examples unless the context clearly dictates otherwise.

In describing and claiming the examples disclosed herein, the singular forms "a", "an", and "the" include plural referents unless the context clearly dictates otherwise.

While several examples have been described in detail, it is to be understood that the disclosed examples may be modified. Therefore, the foregoing description is to be considered non-limiting.

The invention claimed is:

1. A method for making a pouch format cell, comprising:
   forming an outermost stack including a negative electrode and separators positioned on opposed surfaces of the negative electrode;
   forming an inner stack including:
      a positive electrode; and
      at least one sub-stack of another negative electrode, another positive electrode, and other separators positioned on opposed surfaces of the other negative electrode;
   positioning the inner stack on the outermost stack such that i) a first end of the inner stack substantially aligns with one end of the outermost stack, ii) a second end of the inner stack and a portion of the outermost stack remain exposed, and iii) the positive electrode of the inner stack is adjacent to one of the separators of the outermost stack, thereby forming a core stack;

folding the exposed portion of the outermost stack around the second end of the inner stack so as to cover a portion of an outer layer of the inner stack, thereby forming an initial overlay; and folding the core stack a predetermined number of times around at least a portion of the initial overlay.

2. The method as defined in claim 1 wherein the inner stack includes a plurality of sub-stacks.

3. The method as defined in claim 1 wherein the negative electrodes are lithium metal and wherein the pouch format cell excludes a negative-side current collector.

4. The method as defined in claim 1 wherein the negative electrodes are carbon and wherein the pouch format cell excludes a negative-side current collector.

5. The method as defined in claim 1 wherein the positive electrodes are sulfur-carbon composite electrodes and wherein the pouch format cell excludes a positive-side current collector.

6. The method as defined in claim 5 wherein the positive electrodes include a binder and a conductive filler.

7. The method as defined in claim 1 wherein prior to forming the outermost stack and the inner stack, the method further comprises attaching a tab to each of the negative electrodes by:

forming a sandwich structure including a first piece of foil, the negative electrode, the tab, and a second piece of foil; and welding the sandwich structure.

8. The method as defined in claim 7 wherein after the folding of the core stack, the method further comprises welding the tabs attached to each of the negative electrodes together to form a single negative electrode tab.

9. The method as defined in claim 1 wherein prior to forming the outermost stack and the inner stack, the method further comprises attaching a tab to each of the positive electrodes by:

forming a sandwich structure including a first piece of foil, the positive electrode, the tab, and a second piece of foil; and welding the sandwich structure.

10. The method as defined in claim 9 wherein after the folding of the core stack, the method further comprises welding the tabs attached to each of the positive electrodes together to form a single positive electrode tab.

11. The method as defined in claim 1, further comprising trimming an edge of the core stack such that the positive electrodes, the negative electrodes, and the separators are substantially aligned with one another at the edge of the core stack.

12. The method as defined in a claim 1 wherein the core stack includes:

n number of negative electrodes including the negative electrode and the other electrode;

n number of positive electrodes including the positive electrode and the other positive electrode; and 2n number of separators including the separators and the other separators;

wherein a single separator of the $2n$ number of separators is positioned between adjacent electrodes of the n number of negative electrodes and the n number of positive electrodes.

13. The method as defined in claim 1 wherein the predetermined number of times is one time.

14. The method as defined in claim 1 wherein the predetermined number of times is at least two times.

15. The method as defined in claim 1, further comprising:
placing the pouch format cell into a pouch;
adding an electrolyte to the pouch; and
sealing the pouch.

* * * * *